US011338200B2

(12) United States Patent
Norton

(10) Patent No.: US 11,338,200 B2
(45) Date of Patent: May 24, 2022

(54) SERVER LOAD PREDICTION AND ADVANCED PERFORMANCE MEASURES

(71) Applicant: Sony Interactive Entertainment Inc., Tokyo (JP)

(72) Inventor: Geoff Norton, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 107 days.

(21) Appl. No.: 16/816,165

(22) Filed: Mar. 11, 2020

(65) Prior Publication Data

US 2020/0289925 A1 Sep. 17, 2020

Related U.S. Application Data

(60) Provisional application No. 62/819,461, filed on Mar. 15, 2019.

(51) Int. Cl.
*A63F 13/00* (2014.01)
*A63F 13/352* (2014.01)
*A63F 13/79* (2014.01)
*A63F 13/87* (2014.01)
*G06F 16/9535* (2019.01)

(52) U.S. Cl.
CPC ............ *A63F 13/352* (2014.09); *A63F 13/79* (2014.09); *A63F 13/87* (2014.09); *G06F 16/9535* (2019.01)

(58) Field of Classification Search
CPC ...... A63F 13/335; A63F 13/69; A63F 13/795; A63F 13/12; A63F 13/87
See application file for complete search history.

(56) References Cited

U.S. PATENT DOCUMENTS

| 2009/0276771 A1* | 11/2009 | Nickolov ............ H04L 67/1014 717/177 |
| 2012/0142428 A1* | 6/2012 | Wilson .................... A63F 13/79 463/42 |
| 2016/0256784 A1 | 9/2016 | Schultz et al. |
| 2017/0001122 A1 | 1/2017 | Leung et al. |

(Continued)

OTHER PUBLICATIONS

Vlad Nae et al, "Dynamic Resource Provisioning in Massively Multiplayer Online Games", IEEE Transactions on Parallel and Distributed Systems, IEEE Service Center, Los Alamitos, CA, US, vol. 22, No. 3, Mar. 1, 2011 (Mar. 1, 2011), pp. 380-395, XP011328276, ISSN: 1045-9219, DOI: 10.1109/TPDS.2010.82 Sec. 6.1.2.

(Continued)

*Primary Examiner* — Omkar A Deodhar
*Assistant Examiner* — Eric M Thomas
(74) *Attorney, Agent, or Firm* — Penilla IP, APC

(57) ABSTRACT

Methods and systems for provisioning resources for games executed by a cloud gaming system includes accessing online interactions of a plurality of users in relation to a game. The online interactions are processed to classify discussion features obtained from online social communications. A model is generated to predict game use, using the classified discussion features. The model is updated with online interactions received over time. Resources for the game are provisioned at a data center. The provisioning is done by accessing the model and identifying adjustments in the provisioning for an anticipated usage spike that is to occur by a plurality of users, based on current online interactions.

15 Claims, 6 Drawing Sheets

(56) References Cited

U.S. PATENT DOCUMENTS

2017/0304727 A1 10/2017 Gallizzi et al.
2018/0178125 A1 6/2018 Perry et al.
2018/0280802 A1 10/2018 Stroud

OTHER PUBLICATIONS

International Search Report, PCT/US2020/022484, dated May 29, 2020, 4 pages.

* cited by examiner

SERVER LOAD PREDICTION AND ADVANCED PERFORMANCE MEASURES

CLAIM OF PRIORITY

This application claims priority to and the benefit of U.S. Provisional Patent Application No. 62/819,461, filed on Mar. 15, 2019, entitled "Server Load Prediction and Advanced Performance Measures," the disclosure of which is incorporated herein by reference in its entirety for all purposes.

TECHNICAL FIELD

The present disclosure is related to allocating resources for an online game, and more specifically building an artificial intelligence (AI) model using information from user interactions and using the AI model to predict usage of resources and allocate the resources for the online game.

BACKGROUND OF THE DISCLOSURE

Online games, especially, massive multi-player online (MMO) games are accessed by a vast number of users simultaneously via a network of computers distributed across a wide geography. As a result, the MMO games require a lot of coordination of resources for executing game logic of an MMO game, in order to provide a satisfactory game play experience to users. In order to ensure the users who are located in different geo locations to access the online game, the online game is executed on a game cloud using the resources of the cloud gaming system. The users are able to connect to the online game executing on one or more servers of the cloud gaming system. The advantage of executing the online games on the game cloud is that the resources required for the execution of the game are centralized. However, as the number of users playing the online game simultaneously increases, the cloud gaming system resources are increasingly strained making it difficult to provide an acceptable quality of service to the users of the online games.

In order to prevent the resources from straining and to ensure that users' have optimal game play experience, the cloud gaming system may over allocate resources than is actually needed. These resources are expensive and are in very high demand Thus, over allocation of resources results in unnecessary wastage of resources as some of the resources remain idle and are not being fully utilized and leads to incurring unnecessary expenses. Allocating resources in an optimal manner on the cloud gaming system is extremely complex as it is hard to determine the demand for such resources.

It is in this context that embodiments of the disclosure arise.

SUMMARY

Embodiments of the present disclosure relate to systems and methods for provisioning system resources for games executed by a cloud gaming system. The system resources are identified and provisioned by using a resource allocation model that provides information on when to initiate instances of the particular game and when to scale up or down the resources to enable execution of the instances of the particular game. The resource allocation model is built and trained by engaging machine learning algorithm. Online interactions received from a plurality of users for different games are processed by a server of the cloud gaming system to generate and train the resource allocation model. The online interactions may include both in-game interactions and off-game (i.e., out-of-game) interactions, such as social media interactions, etc. A resource usage prediction engine executing within a server of the cloud gaming system processes the online interactions to identify social topics related to a game discussed within, determine a sequence, frequency of occurrence of different social topics within the online interactions to identify discussion features, and classify the discussion features identified from the online interactions, and generate a model of predicted game use. The resource usage prediction engine (simply referred to herein onwards as "prediction engine") identifies and provisions resources based on the predicted game use. When current online interactions are received, the resource usage prediction engine processes the current online interactions to identify discussion features, use the discussion features to predict game use, and provision resources in proportion to the predicted game use.

The model is updated with the current online interactions. When subsequent online interactions are received, the model is accessed to identify adjustments to the provisioning of resources, and to proactively scale up or down amount of resources for the game in proportion of anticipated usage spikes.

The online interactions include both in-game interactions and off-game interactions, such as social media interactions of the users outside of the game. In addition to determining the usage demand for the game, the prediction engine also determined geo-locations where the usage spikes are anticipated to occur and/or specific sub-systems that may be needed to satisfy the anticipated usage spike. For example, the resource allocation model may be used to determine if processing cores, graphics processors, memory, storage, communication bandwidth, etc., need to be scaled up or down to meet the anticipated spike.

A machine learning algorithm within the prediction engine uses online interactions of a plurality of users for a plurality of games gathered from both in-game and off-game interactions at the cloud gaming system to generate a resource allocation model. The resource allocation model predicts game use so that appropriate resources can be provisioned for the game at one or more data centers in one or more geo locations. As additional online interactions are received, the prediction engine processes the additional online interactions and updates the resource allocation model. The updated resource allocation model identifies adjustments to the predicted game use, which correlates to adjustment in the provisioning of resources in proportion to anticipated usage spike.

In one implementation, a method for provisioning resources for games executed by a cloud gaming system, is disclosed. The method includes accessing online interactions of a plurality of users. The online interactions relate to social topics that include a game. The online interactions are accessed from online social communications by one or more of the plurality of users. The online interactions are processed to classify discussion features obtained from the online social communications. A model of predicted game use is generated using the classified discussion features. The model is updated over time based on the online interactions accessed and processed. Resources are provisioned for the game at a data center, wherein the provisioning includes identifying adjustments in the provisioning of resources by accessing the model. The adjustments include increasing an amount of resources for the game at the data center when the model, based on current online interactions, indicates that an anticipated usage spike is to occur by the plurality of users. The provisioning of resources are in proportion to the anticipated usage spike.

In some implementation, the online social communications include in-game interactions or off-game interactions. The off-game interactions include social media interactions or other interactions provided outside of the game.

In some implementation, the social topics are identified using keywords within the online interactions.

In some implementation, classifying discussion features includes performing keyword analysis of an online interaction generated by a user to identify keywords relating to the social topics. The distribution of the keywords within the online interaction is used to define the discussion features. An activity related to the game, performed by the user following the online interaction, is determined, and the discussion features are classified based on the distribution of the keywords and the activity performed in the game. The classification is used in determining the usage spike for the game.

In some implementations, the online interactions are provided by the plurality of users prior to accessing the game. The model is updated with the discussion features identified from the online interactions and activity related to the game performed by the plurality of users following the online interactions.

In some implementation, the resources for the game are provisioned by identifying a geo location where the usage spike is to occur and provisioning the resources for the game at the data center associated with the geo location.

In some implementation, specific sub-systems of the resources required at the data center for the anticipated usage spike, are identified, and the specific sub-systems are provisioned at the data center in proportion to the anticipated usage spike.

In some implementation, the resources are provisioned in accordance to number of instances of the game to be executed, wherein the number of instances is in proportion to the anticipated usage spike.

In some implementation, predicting game use includes correlating a pattern of occurrence of the discussion features in the current online interactions with a corresponding pattern in the model. The pattern in the model is used in mapping the discussion features to an output predicting game use.

In another implementation, a resource usage prediction engine executing on a cloud gaming system for provisioning resources for games, is disclosed. The resource usage prediction engine includes an interaction analyzer, a model trainer, a usage spike predictor and a resource allocation agent. The interaction analyzer is configured to access online interactions from online social communications of a plurality of users and process the online interactions related to a game to classify discussion features obtained from the online social interactions. The model trainer is configured to generate a model of predicted game use using the classified discussion features. The model trainer is further configured to update the model based on online interactions accessed and processed over time. The usage spike predictor is configured to access the model and predict game use using the classified discussion features of the model. The resource allocation agent is configured to provision resources for the game at a data center by accessing the model to identify adjustments in the provisioning of resources. When the model indicates, based on current online interactions, a likelihood of occurrence of anticipated usage spike, the adjustments identify an increase in amount of resources for the game at the data center. The resource allocation agent is configured to provision the resources for the game in proportion to the anticipated usage spike.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

Figure 1:
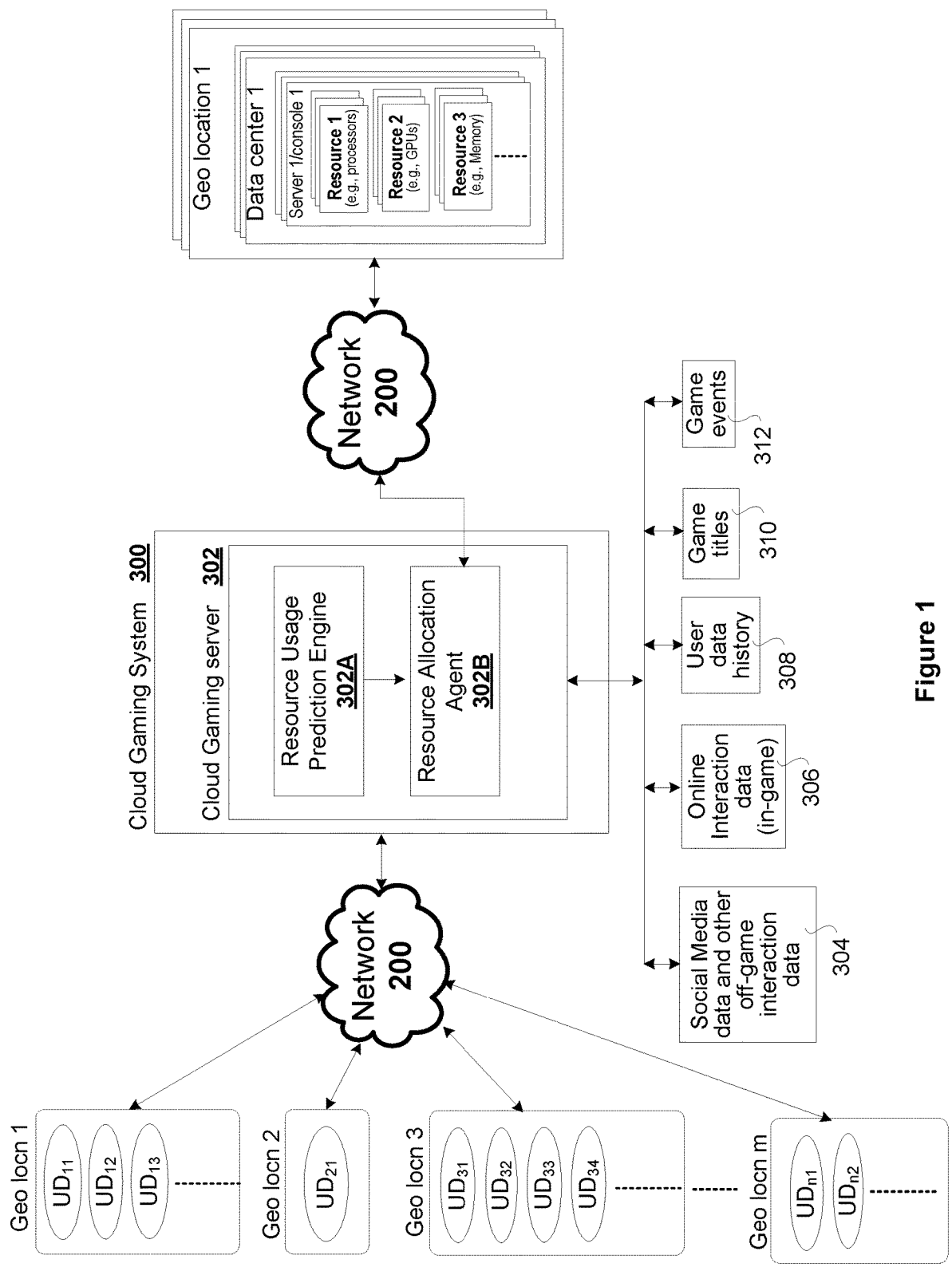
FIG. 1 illustrates a simplified physical view of a cloud gaming system that is used in provisioning resources, in accordance with one implementation of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various implementations of the present disclosure describe systems and methods for implementing machine learning algorithm to build a resource allocation model (i.e., an artificial intelligence model) using online interactions obtained from a plurality of users accessing different games executing on a cloud gaming system. The resource allocation model is used to predict game use and to determine occurrence of anticipated usage spike from the plurality of users and to timely to allocate resources for successful execution of instances of the game. The online interactions include in-game interactions as well as off-game interactions. In some implementations, the in-game interactions may include interactions provided by the users while the users are accessing a game from the cloud gaming system. For example, the in-game interactions may be provided during game play of a game, or during game play of different games available at the cloud gaming system. The off-game interactions may be provided outside of the game and, in some implementations, outside of the cloud gaming system and may include social media interactions, or other forms of interactions including, but not limited to, weblogs, emails, text messages, etc., provided using any interactive tools (e.g., applications, etc.) available to the users.

A user may set up their user account at the cloud gaming system to enable the user to access the various applications and/or games available therein. The cloud gaming system may provide one or more interaction tools, such as in-game or inter-game messaging tools, etc., for users to interact with each other during playing of one or more games or during viewing game play of one or more players. The interaction tools, in some implementations, may provide options to the users to selectively share the interactions with members of a community of users or with their social contacts or with all users accessing the cloud gaming system. During or after the user account has been set up, the user, in some implementations, may link one or more of their social media accounts and/or other interactive application accounts to their user account on the cloud gaming system so that the user can use the interactive tools to interact with other users when accessing the cloud gaming system for playing or viewing a game. The linking provides the cloud gaming system access to the online interactions of the user provided through the social media applications or other interactive applications.

The online interactions generated by a plurality of users are stored in a social post history datastore that is accessible to the cloud gaming system and is used in generating the resource allocation model. The resource allocation model provides information to identify different topics discussed within each online interaction, identify a game associated with the online interaction, determine patterns of occurrence of different topics within the online interactions of the different games to define discussion features, and to classify the discussion features obtained from the online interactions. When current online interactions are obtained from the plurality of users, the resources allocation model is used to correlate the discussion features defined by patterns of occurrence of social topics in the current online interactions to corresponding patterns in the resource allocation model. The correlation maps the discussion features that correspond with the correlated pattern of social topics in the resource allocation model to an output that predicts game use of the game. In some instances, when an event occurs or is scheduled for a game (e.g., a new version release of a popular game, promotion, competition, etc.) there may be a spike in the online interactions of the users. These interactions are provided prior to accessing the game for game play. The online interactions may be followed by some of the users accessing the game for game play. Such spike in interactions and the users' activity in relation to the game following the interactions are processed and the resource allocation model is generated. Information provided in the resource allocation model can be used to predict game use. When current online interactions are received from some of the users (i.e., users who have not accessed the game yet), the current online interactions are processed to identify discussion features defined by sequence and distribution of the social topics within the online interactions. The resource allocation model is accessed to determine predicted game use so that the resources for the game can be provisioned at a data center, in proportion to the predicted game use. When the current online interactions indicate an anticipated usage spike, the resources provisioned for the game is adjusted by increasing an amount of resources for the game at the data center in proportion to the anticipated usage spike.

For example, the online interactions may relate to a new version of a game that is being released or is scheduled to release to the cloud gaming system, and the social topics of discussion may relate to a release event associated with the particular game. The discussion feature may correspond to the social topics, frequency and sequence of distribution of the social topics, context of the social topics, etc. A spike in the online interactions may be detected as the release event date approaches. Based on the discussion features identified in the current online interactions and based on the interaction spike, the resource allocation model may be used to predict a likelihood of occurrence of an anticipated usage spike for the game. The resources may be provisioned in proportion to the anticipated usage spike so that in the event that the users providing the online interactions access the game for game play, sufficient resources are available to service the access requests.

The predicted game use is determined from the online interactions provided by a plurality of users and from selection activity of the game following the online interactions detected from some of the plurality of users. The anticipated usage spike is determined from current online interactions of some of the plurality of users, using the resource allocation model, prior to receiving requests for selecting the game for game play from some of the plurality of users. The prediction engine proactively provisions the resources in proportion to a number of instances of the game being executed, in anticipation that some of the plurality of users will select the game for game play. Additionally, the current online interactions are used to further train the resource allocation model so as to adjust the predicted game use, in response to the expressed interest from some of the plurality of users.

Conventional way of provisioning system resources resulted in the cloud gaming system (CGS) over allocating or under allocating the system resources, as the resources were being provisioned as and when demand for such resources was detected at the CGS. This resulted in wastage of resources or unnecessary delay for the users as the system resources were being provisioned based on the current demand By predicting the usage demand for a game based on number of users currently expressing interest in the game (determined from current online interactions provided for the game by some of the plurality of users) and information provided in a resource allocation model generated using interactions from the plurality of users, and provisioning the resources for the game in a timely manner, results in optimal use of system resources and enriched experience for the users. For example, based on the information provided in the resource allocation model and based on the current online interactions gathered for the game, the cloud gaming system can predict when to anticipate an usage spike for the game, and responsively provision the resources ahead of time in anticipation the users will access the game for game play.

The resource allocation model may also be used to determine specific geo locations where a usage spike is anticipated so that a number of instances of the particular game may be instantiated in data centers that are in or are associated with the specific geo locations and such instantiating is done prior to receiving any request for use of the game for game play.

With the general understanding of the inventive embodiments, example details of the various implementations will now be described with reference to the various drawings.

FIG. 1 provides an overview of a cloud gaming system 300 used for provisioning instances and resources for a particular game, in accordance to one implementation. A plurality of user devices 100 access the cloud gaming system (CGS) 300, social media applications, and other interactive applications over a network 200, such as the Internet. The user devices may be accessing the CGS 300 from across different geo locations. As shown in FIG. 1, user device $UD_{11}$, $UD_{12}$, $UD_{13}$, etc., are accessing the CGS 300 from geo location 1, $UD_{21}$ from geo location 2, $UD_{31}$, $UD_{32}$, $UD_{33}$, $UD_{34}$, etc., from geo location 3, and so on. The user devices (i.e., client devices) can be any type of client computing device having a processor, memory, having LAN, wired, wireless or 5G communication capabilities, and being portable or not portable. For example, the client devices can be smartphones, mobile devices, tablet computers, desktop computers, personal computers, or hybrids or other digital devices that include monitors or touch screens with a portable form factor.

The client devices having 5G communication capabilities may include mobile devices that are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

The client devices may run an operating system and include network interfaces that provide access to various applications (apps) available on the servers in the CGS 300 over the network 200 or could be thin clients with network interface to communicate with the servers, which provide the computation functions. Users may access the CGS 300 using a user account and select an online game available at the CGS 300 for game play, wherein the game play is controlled by the users using control options provided in the client devices or using controllers that are communicatively connected to the client devices.

In some implementations, the various applications (e.g., online games) may be executed remotely on one or more servers of the cloud gaming system and data from the executing application streamed to the client device over the network 200. In other implementations, the online games may be executed locally at the client devices and metadata from the executing online game is transmitted over the network 200 to the servers for affecting the game state. Online interactions provided by the users are used as training data for the purpose of generating and training an artificial intelligence (AI) model, used to predict game use and to provision instances and resources for an online game ahead of receiving requests for accessing the online game for game play.

The cloud gaming system (CGS) 300 includes a network of back-end servers 302 distributed across different geo locations and are configured to execute instances of one or more online game applications and/or other interactive applications. The back-end server 302 may be a game or application server that is configured to execute one or more instances of one or more games/interactive applications. For purpose of simplicity, reference will be made to a game server executing an online game application, although the implementations disclosed herein can be extended to any other interactive applications. The game server may be any type of server computing device available in the cloud gaming system, including, but not limited to, a stand-alone server, a server that is part of a server farm or data center, etc. Further, the game server may manage one or more virtual machines supporting a game processor that executes an instance of an online game for a user, on a host.

The online game executed by the cloud gaming server 302 may be a massive multiplayer online (MMO) game and the cloud gaming server 302 may include a multi-player distributed game engine that is communicatively connected to game logic of the online game. Generally speaking, a game engine is a software layer that serves as a foundation for a game, such as MMO game, and provides a framework that is used to develop the online game. The game engine abstracts the details of doing common related tasks (i.e., game engine tasks) required for every game, while the online game developers provide the game logic that provides the details of how the online game is to be played. The game engine framework includes a plurality of reusable components for processing several functional portions (i.e., core features) for the online game that bring the online game to life. The basic core features that are processed by the game engine may include physics (e.g., collision detection, collision response, trajectory, movement of object based on gravity, friction, etc.), graphics, audio, artificial intelligence, scripting, animation, networking, streaming, optimization, memory management, threading, localization support, and much more. The reusable components include process engines that are used to process the core features identified for the online game.

During game play of an online game, the game engine manages the game logic of the online game, collects and transmits user inputs received from different client devices to the game logic, manages the allocation and synchronization of the functional portions of the game engine to process game data generated by the game logic, in an optimal manner, and generates frames of game data that is transmitted back to the client devices for rendering. A variety of game engines that are currently available provide different core functionalities and an appropriate game engine may be selected based on the functionalities that are available for executing the online game.

The game logic analyzes the user inputs, affects game state of the online game based on the user inputs, manages saved data of each of the users playing the online game, and generates game data that is processed by the distributed game engine prior to being streamed to the different client devices of the users during a MMO game session. The game state identifies overall state of the online game at a particular point and is affected by intricacies of the game play of each player (i.e., a user engaged in game play of a game). The saved data of each user includes any game customization provided by the user, for the online game. The multi-player distributed game engine, using the game states provided by the game logic, is able to overlay/insert objects and characters into each of the gaming environments of the players participating in the MMO game session. In some implementations, the game logic of each instance of the game may be executed on a server or on a plurality of servers, based on how the game logic is configured.

In addition to providing user inputs to the MMO game, the users may also communicate with one another during game play of the MMO game. The distributed game engine, in addition to managing the allocation of the core features during game play of the game, also manages the online interactions of the plurality of users. The online interactions are generated using interactive tools available to the online game and/or to the distributed game engine, based on how the users have set up their game account and the interactive application accounts. The distributed game engine stores the online interactions in different datastores, and makes it available for generating and training an AI model.

In some implementations, the interactive tools are provided by the game engine, or the game logic, or the gaming server to allow the users to interact with one another within the online game environment of each user. In alternate implementations, the game engine or the gaming server may provide access to interactive tools of social media or other interactive applications to allow the users playing or viewing the MMO game to interact with each other and/or with other users that are or are not playing the MMO game outside of the online game environment. The online interactions provided through the different interactive tools/applications as well as the data from game play of the different games that affect the game states of the different games, are collected by the distribution game engine and stored in different datastores.

For example, the distributed game engine executing on the cloud gaming server 302 may store and retrieve the different data related to the game play and user interactions in different datastores, such as social media interactions datastore 304, online interaction datastore 306, user data history datastore 308, to name a few. The distributed game engine may interact with the social media interactions datastore 304 to store and retrieve the off-game interactions generated by a plurality of users (e.g., players or non-players) using the interactive tools. The off-game interactions include social media interactions (i.e., interactions that were generated outside of the gaming environment, using social media application tools) between a player (i.e., a user playing the online game available in the cloud gaming system) and social contacts of the player, wherein the social contacts may be other players playing the same game, playing a different game, or a non-player (e.g., a spectator or other user). In some implementations, the off-game interactions may include other interactions generated from interactive tools other than social media tools. For example, the off-game interactions may be generated as emails, text messages, weblogs, etc., between the player playing/the spectator viewing the game play of the game and other users that are part of a community of users, wherein the interactions are generated using other interactive tools. Access to the user's social media and other online interactions may, in some implementations, be provided by the user by linking the user's social media account or other interactive accounts to their user account in the cloud gaming system.

Additionally, the distributed game engine may store and retrieve the in-game interactions generated by the user within the gaming environment while the user is accessing an online game for viewing or playing, from the online interaction datastore 306. If the user (i.e., a spectator) is viewing the game play of a player, the interactions may be between the spectator and the player. Such in-game interactions are generated using interaction tools provided within the game.

In some implementations, the game engine and instances of the game logic are distributed across a plurality of servers in different geo locations. The distributed game engine may process the game data generated by the game logic and the online interactions generated by the users at the respective geo locations, locally and in parallel, and synchronize the game data and the online interactions with other servers within the cloud gaming system 300. In this manner, the distributed game engine allows for faster and efficient processing of the game data and the online interactions. The game data that is output from the game logic and processed by the instances of the game engine are synchronized, assembled, encoded and streamed to different client devices for rendering, in response to user inputs provided during game play of the game. A synchronization engine within the game engine may be used to synchronize the distribution of the game data to the different servers for processing and manage the routing of the processed game data between the servers. The processed online interactions are used to train a resource allocation model used for predicting game use. The generated resource allocation model may be maintained on a first server and trained using the updates received from the different servers.

The distributed game engine or the game logic may store the game play data and game state of all the games played by different users at different geo locations, in the user data history datastore 308. As the user plays an online game at the CGS 300, the game logic of the online game uses the user inputs provided by the users during game play to affect game state of the online game. The game state provides intricacies of the game play of the online game and is used to identify user metrics and game state metrics. In response to the user inputs, the game state of the online game is determined and updated to the user data history datastore 308 so that the game state of the online game can be available in a central location for the distributed game engine to use. The game state, in some implementations, may include game ID, game name, game characters, game attributes, game objects, game object attributes, game object state, graphic overlays, etc. The game state of a game may also include state of every device or module or system component of each of the servers within the network of servers that were used in the execution of the instances of the games and for communicating game data, wherein the states of device or module or system component may include states of CPU, GPU, memory, register values, program counter values, programmable DMA state, buffered data for the DMA, audio chip state, CD-ROM state, communication bandwidth used, communication bandwidth assigned, etc.

In addition to the game related data included in the game state, the game state may also include user saved data of the users playing or viewing the different online games. For example, the user saved data for a user (i.e., a player or a non-player (i.e., spectator)) may include user profile and user related information of the user, user customizations to game objects, expertise level, type of player, amount of game tools/winnings/points/cash/awards won, amount of time spent playing or viewing an online game, number of challenges overcome, number of attempts to overcome each challenge, etc. The game state may also include randomly generated features or AI overlays or game intricacies that are useful in understanding the game details associated with game play of the online game.

Additionally, the distributed game engine may interact with game titles datastore 310, game events datastore 312, etc., to retrieve game related data provided by different game title handlers, such as game developers, game promoters, game organizers, etc. The distributed game engine may store titles and game logic of all the games that are available to users accessing the CGS 300, in the game titles datastore 310. The game logic included in the game titles datastore 310 can be used to execute game instances of a game at one or more data centers in different geo locations.

The game events datastore 312 may be a repository that keeps track of different events that have occurred for each game, events that are scheduled to occur for different games, details of such events, such as days and times such events have occurred or are scheduled to occur, frequency of such events, etc. Information related to the game events may be updated from information obtained from a game developer, a game promoter, an event organizer, or from a user (i.e., a player or a non-player), or from any other source. Some example events that may be scheduled for an online game may include a new release event, a new (version) launch, a promotion, a competition, etc. The examples of events are provided as mere examples and should not be considered as restrictive.

The game engine retrieves and uses the information from the different datastores to determine a number of online interactions provided by the users in relation to a game, social topics discussed within, determine frequency and a pattern of distribution of the social topics within the online interactions to define discussion features, and generate a resource allocation model using the discussion features. The online interactions are accessed from online social communications generated by one or more of the users prior to the one or more users accessing the online game for playing. As and when the one or more users select the game for game play activity following the online interactions, the resource allocation model is updated with data corresponding to the game play activity. Information provided in the resource allocation model can be used to predict game use. For instance, the resource allocation model can be used to identify which ones of the discussion features (i.e., occurrence of social topics and the pattern of occurrence) within the online interactions that ended with the users accessing the game for game play. When current online interactions are received from other users, a resource usage prediction engine (or simply referred to as "prediction engine") 302A within the game engine is used to identify the discussion features occurring in the current online interactions and correlate them with corresponding discussion features in the resource allocation model to determine if the discussion features of the current online interactions translate to game play of the game. Based on the determination from the resource allocation model, the prediction engine 302A can easily predict anticipated usage spike for the game from the users providing the current online interactions, ahead of time and prior to the users selecting the game for game play. The determination of the anticipated usage spike using the resource allocation model can be used scale up or down the resources provisioned for the game.

In addition to predicting usage spike, the prediction engine 302A identifies specific geo locations where such usage spikes are predicted to occur. Based on the predict usage spike information, the resource allocation agent 302B signals data centers in the respective ones of the geo locations to responsively provision instances of the online game in the corresponding one or more servers and to dynamically adjust the relevant resources at the one or more servers or in the data centers to enable successful execution of the instances of the online game. The signal generated by the prediction engine 302A assists the resource allocation agent 302B to localize the instantiating of the online game instances and provision resources to specific geo locations where a spike in usage demand is predicted. Additionally, the prediction engine may also indicate which sub-systems of the resources need to be provisioned at the specific geo locations so that only the indicated sub-systems of the resources are provisioned in the specific geo locations and not all of the resources, which could result in wastage of expensive resources. This localized provisioning of specific ones of the resources are done ahead of time prior to receiving any requests for game play of the online game from users, thereby ensuring optimal use of the resources and timely provisioning of the resources for the users to use.

Figure 2:
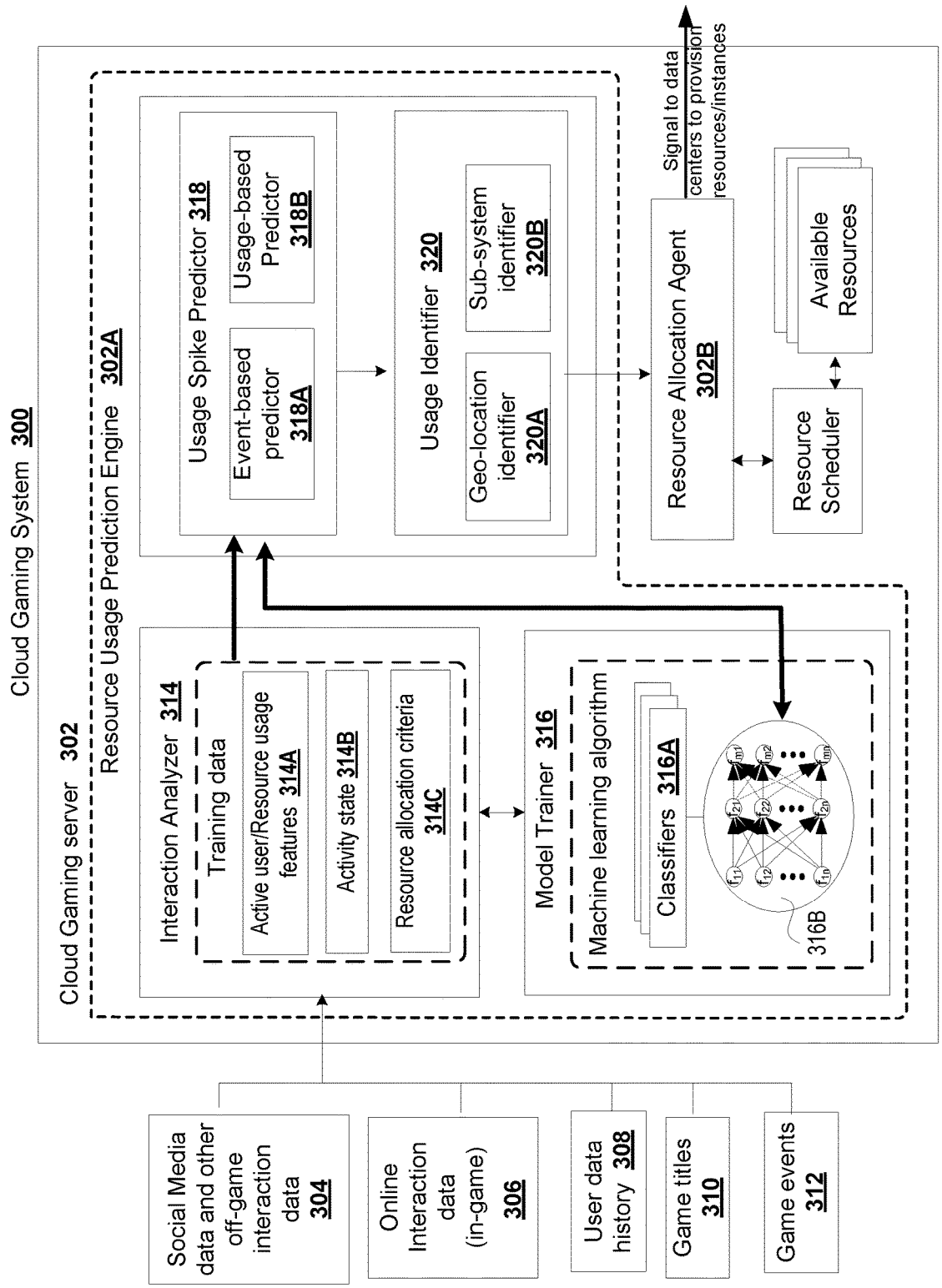
FIG. 2 illustrates a simplified block diagram of a resource usage prediction engine executing within a cloud gaming server for provisioning resources for games, in accordance with one implementation of the present disclosure.

FIG. 2 illustrates different module engines/logic within the resource usage prediction engine (i.e., prediction engine) 302A that is used to predict usage spike for a game available within the cloud gaming system and to responsively provide sufficient instances of the game and system resources ahead of time and prior to receiving requests for game play of the game. Provisioning of the instances and adjusting of the system resources are done by anticipating usage spike for the game from a set of users based on current online interactions received from the set of users and information provided in a resource allocation model. The provisioning is done in anticipation that the game instances and system resources will be used by the set of users for game play following the online interactions.

The resource allocation model is built using the discussion features identified from in-game and off-game interactions accessed from online social communications for different games provided by different users. Some of the engines within the prediction engine 302A includes an interaction analyzer 314, a model trainer 316, a usage spike predictor engine 318, and a usage identifier engine 320.

The distributed game engine gathers the online social communications of the plurality of users and provides them to the interaction analyzer 314. The online social communications may include off-game interactions provided using social media tools, for example. The interaction analyzer 314 analyzes the online interactions provided by the distributed game engine to define discussion features. The online interactions are maintained in one or more repositories and provided to the interaction analyzer 314 for defining discussion features. During analysis, the interaction analyzer 314 identifies social topics that are discussed within and uses the frequency and distribution of the social topics to define the discussion features. The discussion features are used to build a resource allocation model. In some implementations, the online social communications may include in-game interactions generated within the gaming environment using one or more interactive tools provided by game logic of one or more games, or game server, or game engine. In other implementations, the online social communications may include off-game interactions that are provided outside of the gaming environment using interactive tools, such as social media tools, email tools, weblog tools, text message tools, etc. Access to the interactive tools for generating off-game interactions and access to the online social communications providing the off-game interactions may be provided by the user by linking their social media accounts or interactive application accounts to the corresponding user's account on the cloud gaming system.

The interaction analyzer 314 identifies social topics and context of the online interactions by performing keyword analysis of the content of each online interaction generated by users. The online interactions may be related to a single game or to a plurality of games. The context may identify one or more events (e.g., a new release, a promotion, a competition, etc.) occurring in the game. The frequency and distribution of the social topics within the online interactions are used to identify discussion features, which can be used to gauge expressed or implied interest of the users for the respective game. The context of the discussion and identified discussion features may be used to determine if the interactions are favorable to the game or not. For example, the interactions that include positive comments/reviews for the game may be indicative of the respective users' expressed interest in the game. In alternate example, the interactions may include discussions that are indicative of certain actions the users intend to perform for the game, such as expressed intent to access or load the particular game application on their client device, etc., and such expressed intent may be related to certain events that are scheduled to occur (e.g., new version release, new promotion, a competition, etc.) in the game.

The interaction analyzer 314 uses the discussion features to predict active users that and resource usage for the game. For example, the active user feature may be based on the number of users expressing interest in playing the game or number of users discussing about the game or number of users accessing the CGS 300 to load a client version of the game application. The users expressing interest in the game may be determined by the favorable comments/reviews provided by the respective users. Thus, by analyzing the context of the online interactions and of the discussion features, the interaction analyzer 314 may be able to correctly gauge the active users. The interaction analyzer 314 uses the various social topics and the discussion features identified from the online interactions to generate the vector, which is then used to build the resource allocation model.

The number of active users determined from the online interactions and the game type of game can be used to determine resource usage features for the game. The resource usage can be dependent on a type of game and the type of active users expressing interest in the game. For instance, for a MMO game and/or high intensity game and/or graphic intensive game, the resource usage is high as opposed to a game that is a single player game and/or a low intensity game. The high resource usage may be due to the amount of data that is to be generated and transmitted to client devices. Similarly, a game (either a MMO game or a single user game) that is in high demand based on the number of active users expressing interest in game play may have a high resource usage, as opposed to a game that is not in high-demand. Further, resource usage for a user expressing interest in game play of the game may be different from that of a spectator expressing interest in following game play of a player. The resource usage may thus be determined based on the number and type of users expressing interest in the game and the type of game, and the interaction analyzer 314 has sufficient built in logic to easily gauge the resource usage by analyzing the online interactions.

The interaction analyzer 314, in some implementations, may accord a weight for each social topic and each discussion feature (e.g., frequency and distribution of social topics) identified from the online interactions, and generate a vector for the game taking into consideration the corresponding weights of the social topics and discussion features, wherein the discussion features identify the context of the social topics included in the respective online interactions. In some implementations, the vector that is generated from the online interactions may include bunches of zeros and ones, wherein each zero or one corresponds to a social topic or discussion feature identified in the online interaction. For example, the interaction analyzer 314 may accord a weight of one to a discussion feature that pertains to a specific action initiated by a user in relation to the online game (e.g., downloading the online game, starting a game console, discussing launch event, etc.). Along similar lines, the interaction analyzer 314 may accord a one when the particular game discussed in the online interactions is of a specific game type (e.g., a MMO game, or a high-intensity game, or a computationally intensive game, or a game with lot of graphics, etc.), and a zero when the game type is of a different game type (e.g., a single person game (e.g., first person shooter game) or a less intense game or includes less graphics, etc.). Similarly, the interaction analyzer 314 may also include activities and time such activities were performed by the respective users following the online interactions that included specific ones of the discussion features. For example, the interaction analyzer 314 may accord a one when the users selects the game for game play during peak hours, a zero when the user selects the game for game play during non-peak hours, a one when the user selects the game for game play and a zero when the user selects the game for viewing game play of other users, etc. These intended or expressed interests of users identified from the discussion features of the online interactions are used to determine active users and resource usage (i.e., usage demand) for the particular game. The vector that is generated with the online interactions of the plurality of users identifies a pattern of occurrence of the social topics (i.e., keywords) within the discussion features identified from the online interactions. It should be noted that the online interactions could be generated by players, social contacts of players, a community of players, spectators, or other users, wherein some of the online interactions may be generated during use of the game and others prior to the use of the game.

In addition to identifying the various features from the online interactions, the interaction analyzer 314 may also identify activity state 314B for each online game, based on the activities performed by the users following the generation of the online interactions, in response to occurrence of certain events in the respective online game, and a time frame within which such activities were performed. These activities include selection of a game for game play, selection of a game for following a game play of a player, continuing game play of the game, etc. For example, when a user generated an online interaction for the game and subsequently selected the game for game play or for following the game play of another user, the interaction analyzer 314 detects such activity by the user and uses it to generate activity state 314B of the game and associates it with the online interaction of the user. The activity states 314B for the game may be based on the online interactions generated by the users and may include a game identifier of the game, user identifier of the user that provided the online interaction(s) for the game, user identifier of the user who selected the game for game play following the online interaction(s), the time when the game was selected for game play following the online interaction(s), lapse of time between the online interaction and the game play activity.

The interaction analyzer 314 also specifies one or more pre-defined resource allocation criteria 314C. The pre-defined resource allocation criteria may, in some implementation, specify when a number of instances of a particular game and/or specific sub-system of the system resources need to be adjusted up or down. For example, the resource allocation criteria may specify an acceptable pre-defined percentage of spike in usage before resources should be provisioned, acceptable load on each resource before the resource can be scaled up or down, acceptable speed for provisioning resources, etc. Thus, when the predicted spike in usage exceeds from the existing usage demand by the predefined percentage, the system resources and/or number of instances for the game may need to be adjusted up or down. The features pertaining to active users and resource usage 314A, activity states of the game 314B, as well as the resource allocation criteria 314C together form the training data that is used by a model trainer 316 to generate and train a resource allocation model. The aforementioned data components of training data are provided merely as an example and that other types of game related data components can also be considered for training the resource allocation model 316B.

The model trainer 316 within the prediction engine 302A engages a machine language algorithm (having artificial intelligence) to generate the resource allocation model that is used to predict game use for the game in the CGS 300. The generated resource allocation model is trained with discussion features from the online interactions received from the users over time. In some implementations, the online interactions used for generating and training the resource allocation model are related to the game. In other implementations, the online interactions used to generate and train the resource allocation model are from a plurality of games. The generated resource allocation model is used to predict use of each game, so that an appropriate signal can be transmitted to a resource allocation agent to responsively scale up or down a number of instances for the respective game, and different types of resources so that the instances of the game can efficiently execute at the CGS 300. Further, the resource allocation model may be used to identify specific geo locations where resources need to be provisioned and/or specific resource sub-systems that need to be scaled up or down in response to usage demand, and the signal transmitted to the resource allocation agent can provision the resources/instances or specific resource sub-systems in proportion to the predicted game use in the specific geo locations.

The machine learning algorithm engages classifier engines (i.e., classifiers) 316A to generate and train the resource allocation model 316B. The classifiers 316A are used to populate various nodes within a network of interconnected nodes of the resource allocation model 316B wherein each node relates to a different discussion feature identified from the vectors generated for the online interactions. The inter-relationships between the nodes are established to understand the intricacies of the patterns of social topics included in the discussion features for a game to identify different usage outputs that meet the resource allocation criteria defined for each online game. The different outputs follow different inter-relationship paths of the resource allocation model.

The classifiers are pre-defined to identify and classify specific discussion features of the online interactions in order to meet resource allocation criteria for the online game. The classifiers that are used to build and train the resource allocation model learn to identify the intricacies of the discussion features (i.e., frequency and pattern of occurrence of social topics) and to determine the influence of these discussion features toward outcomes that meet the resource allocation criteria defined for the online game. The classifiers may use the online interactions related to the online game or related to the plurality of games to understand the intricacies of the discussion features. Accordingly, the discussion features are updated to the nodes within the layers of interconnected nodes, and the interconnected nodes are used to identify an output that meets the resource allocation criteria. For simplicity sake, the discussion features, the various implementations will be discussed in relation to populating the nodes of the resource allocation model with discussion features of a game. However, the implementations may be extended to including discussion features of a plurality of games in populating the nodes of the resource allocation model. The classifiers use the cumulative discussions from the plurality of users to develop and train the model.

The resource allocation criteria, as mentioned previously, may specify acceptable usage demand percentage for provisioning resources, acceptable load on each resource before the resource can be scaled up or down, acceptable speed for provisioning resources, etc. The resource allocation model may identify different outputs for different resource allocation criteria. The outputs that are identified from the resource allocation model are for pattern of social topics defined in the discussion features identified in the online interactions for a game. The pattern of topics and the number of interactions for the particular game are indicative of users' expressed or implied interest in the particular game, which may be used to predict a usage spike for the game.

The machine learning algorithm uses the various discussion features identified from the online interactions as inputs to nodes of the resource allocation model, progressively updates the nodes using discussion features identified from online interactions received over time from different users, and adjusts the outputs to meet the resource allocation criteria. Thus, the machine learning algorithm uses reinforced learning to strengthen the model by using initial set of the online interactions of the plurality of users to build the model, learn the intricacies of the discussion features identified from the online interactions and how they can be used in predicting game use, and use ongoing online interactions from the users received over time to reinforce the learning and strengthen the model. The strengthened model is used to adjust the prediction of game use. The adjusted outputs are indicative of anticipated usage spike that is likely to occur for the game from the users providing the online interactions over time. The adjusted outputs relate to adjustment to the resources that are to be provisioned for the game, wherein the adjustment to the resources are in proportion of anticipated usage spike determined from the online interactions received over time.

Each classifier 316A is pre-defined to identify and classify specific ones of the discussion features identified from the online interactions by different users. The classifiers are configured to classify the discussion features based on frequency and distribution of social topics, tune the model with ongoing online interactions obtained from social communications provided over time to determine how the distribution (i.e., pattern of occurrence) of the social topics relates to a user selecting the game for game play following the ongoing online interactions, identify the time span between the online interactions for the game provided by the users and the users selection of the game for game play activity. The correlation between the discussion features and the selection of the game for game play determines the predicted use demand for the game.

It should be noted that the changes in the use demand for the game may be event-based or may be usage-based, which can be topical in nature, temporal in nature, based on popularity of the game, or may be based on any other criteria. It should be noted that not all of the predictions in the use demand need an increase in the amount of resources that are to be provisioned for the game. In some implementations, the prediction in the game use may need less resources than what is already provisioned. In such implementations, the predicted use demand would indicate such changes so that the resource allocation agent 302B may be able to scale down the provisioned resources in proportion to the predicted use demand. The changes in the use demand may be predicted from the online interactions generated by the users. The resource usage to satisfy the predicted use demand may be determined based on the number of active users that have expressed interest in the game, the type of game, amount of game data that is to be generated and/or transmitted, type of activity, etc. For example, the type and amount of resources needed to allow a player to play a game is different from type and amount of resources needed for allowing a user to view or follow game play of a player. When a player is playing a high intensity game, the player expects the game data to be provided with minimal latency and with high resolution to allow the player to strategize their next move and provide inputs. As a result, the resources that may be required for providing the player with game data may include fast processors, high resolution GPUs, fast communication connections and high bandwidth communication for streaming game data, etc. On the other hand, the resource usage for a low intensity game or for a spectator may not require such resources.

When current online interactions for a game are received from a plurality of users that have not yet accessed the game, the model trainer 316 uses the discussion features of the current online interactions included in the training data, and correlates the discussion features to corresponding discussion features in the resource allocation model to identify a corresponding output that meets the resource allocation criteria. The current online interactions received from the users (i.e., cumulative interactions from the users) are then considered with the output from the resource allocation model to determine if usage spike can be anticipated to occur in the game by the users providing the current online interactions. It should be noted that the current online interactions by the users received via online social communications are provided by the users prior to receiving any selection activity from the users. Based on the anticipated usage spike, required resources (i.e., specific sub-systems) can be provisioned in a timely manner and such provisioning is done based on the predicted game use and prior to the users accessing the game for game play. The current online interactions are then used to further train the resource allocation model. The training strengthens the resource allocation model by reinforcing the learning.

The usage spike may be anticipated to occur only in some geo locations. In order to determine which geo location can anticipate usage spike to occur, the training data identified from the current online interactions of the game is forwarded to a usage spike predictor 318 within the prediction engine 302A to predict the game use demand. The usage spike predictor 318 uses the predicted game use determined from the resource allocation model for the current online interactions identified in the training data for the game to determine the underlying reasons for the predicted game use of the game. If the predicted game use corresponds to an event that is scheduled to occur for the game, then an event-based predictor 318A within the usage spike predictor 318 is used to identify the output in the resource allocation model 316B that corresponds to the event, wherein the output that is identified satisfies the resource allocation criteria 314C defined for the game. The predicted game use is determined by correlating the pattern of occurrence of the social topics in the discussion features to corresponding discussion features related to the event in the resource allocation model. As mentioned previously, the resource allocation criteria 314C may indicate when resources need to be provisioned for a predicted game use (i.e., usage demand) The output from the resource allocation model may indicate that a usage spike is likely to occur for the event, by the users that provided the current online indications and the amount of resources that need to be provisioned to service the usage spike for the event. The prediction engine may provision the amount of resources in proportion to the usage spike.

If, on the other hand, the predicted game use does not correspond to an event, then predicted game use may be related to usage-based demand A usage-based predictor 318B is used to match the discussion features obtained from the current online interactions generated for the game to corresponding discussion features in the allocation model. The usage-based predictor 318B uses the mapping of the matched discussion features in the allocation model 316B to corresponding predicted use output that satisfies the resource allocation criteria 314C for the game. The predicted use output identified from the allocation model 316B is used to predict the usage spike for the game. The prediction engine, based on the usage spike predicted for the game, provisions the necessary resources in proportion to the predicted usage spike.

The usage spike predictor thus uses the information from the historical online interactions for the plurality of games available to the CGS 300 and the current online interactions of a particular game to predict usage demand for the particular game. The historical online interactions and the current online interactions include both in-game interactions and off-game interactions. In addition to predicting the usage demand for the particular game, the usage spike predictor may also identify a time period within which the instances and resources need to be provisioned so as to be available for the users, when the users access the particular game for game play activity.

Figure 3:
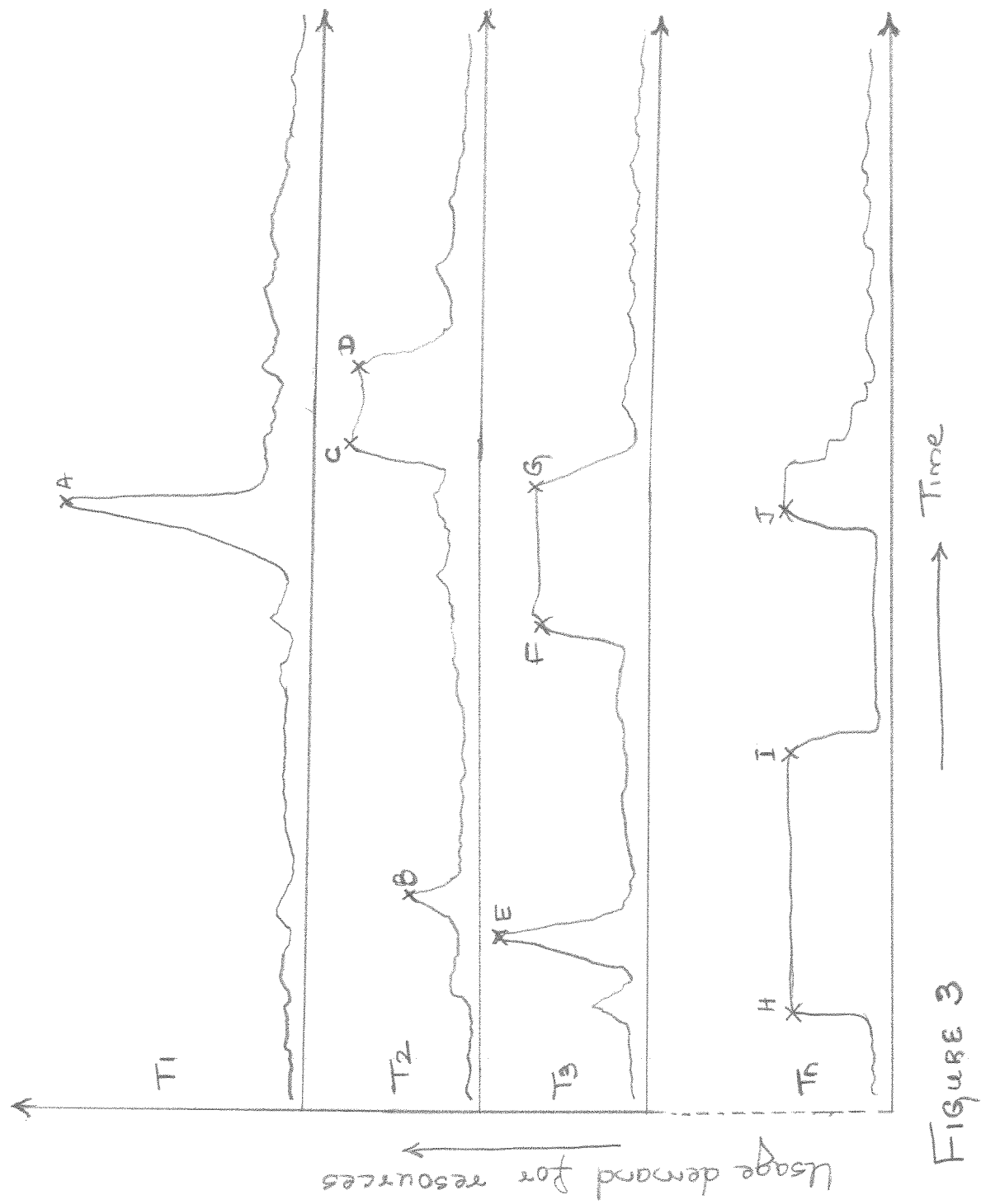
FIG. 3 illustrates a graph of usage demand over time for a single game or for a plurality of games, in accordance with one implementation of the present disclosure.

FIG. 3 illustrates time-based graph identifying resource usage demand determined from the online interactions of the users obtained from online social communications that are available to the CGS 300. The time-based graph illustrated in FIG. 3 shows temporal variation in the resource usage demand for a game in one geo location identified using online interactions for the game provided by the users and from the resource allocation model. The time-based graph may also be generated from the online interactions of different games over different time frames. As the usage demand for the game can vary over time based on the users interest, predicting spikes in the game use and adjusting the system resources ahead of such predicted spikes in anticipation the system resources will be used by the users, allows the cloud gaming system to manage the resources efficiently while enriching users game play experience. While predicting spikes in game use and provisioning resources to satisfy the predicted spike, the prediction engine 302A takes into consideration a number of instances of the game that are currently executing, number of instances that are currently available for game play, current state of various system resources in geo locations where the usage spike is predicted to occur and provisions the instances and resources appropriately, so that sufficient instances and resources can be made available for efficient running of the instances of the game.

Referring to FIG. 3, in graph T1, based on the online interactions collected from in-game and off-game interactions of a plurality of users for a game, the usage demand for the game is shown to remain at normal level till point A where it peaks, and is then followed with a drop in the usage demand to a normal level. Although reference is made to a single game, it should be noted that the usage demand on the resources may be determined based on a plurality of games and as such the online interactions of the plurality of games may be considered for generating the graph. In graph T2, the usage demand is shown to peak at point B following which the usage demand is shown to drop to normal level and then is shown to rise again at point C and continue to point D after which the usage demand is shown to drop to the normal level. The drop and rise in usage demand may be due to some event occurring in the game, or may just be due to increase in the number of users accessing the game. The rise in usage demand requires significant amount of resources. The graph of FIG. 3 shows the peaks in usage demand of the system resources at different times and the time lapse between the usage demand peaks (e.g., time lapse between points B and C). In graph T3, the usage demand is shown to peak first at point E after which the usage demand is shown to drop to a normal level and then shown to peak from point F through point G after which it is shown to drop to normal level. Similarly, in Tn, the usage demand is shown to peak at point H and remains till point I after which it is shown to drop to normal level only to peak again at point J and continue till point K after which there is a graduated decrease in the usage demand. The different peaks identified in the graph of FIG. 3 may be due to a single activity (e.g., game play activity) or different activities (e.g., game play activity, game viewing activity, etc.) performed by different users (i.e., players, spectators) in the game. The interaction analyzer 314 identifies the discussion features for the game using the online interactions and generates corresponding vectors for the game identifying the discussion features and, in some implementations, using weights for the different discussion features. The identified vectors of the game are used to generate the allocation model, which is used to predict game use for the game. The resource allocation model is tuned with ongoing online interactions received from the users and the outputs are adjusted. The adjusted outputs may indicate an anticipated usage spike for the game from the users providing the ongoing online interactions.

This predicted game use can be used to provision instances and resources for the game in a timely manner, in anticipation that the predicted game use translates to actual use of the game by the users. This type of provisioning by predicting game use for the game by matching discussion features identifying patterns of social topics from current online interactions with corresponding discussion features from the resource allocation model, allows for efficient management of system resources. The timely provisioning provides optimal game play experience for the users while ensuring that the expensive system resources are not idling.

A usage identifier 320 within the prediction engine 302A is used to further ensure that the correct type and amount of system resources are being assigned where and when needed within the CGS 300. The usage identifier 320 receives the predicted use information from the usage spike predictor 318 and extracts resource usage specificity for the game. For example, the usage identifier 320 may identify one or more geo locations where the anticipated usage spike is to occur and/or may identify specific sub-systems that are required for satisfying the anticipated usage spike. Identifying the geo location ensures that the system resources are provisioned only in the geo locations where the usage spike is to occur and not across all the geo locations, which can result in wastage of expensive resources. Similarly, identifying the sub-systems ensures that the required type and amount of system resources are provisioned to satisfy the usage spike and not provision all sub-systems, which can also lead to wastage of resources. For example, for a computation intensive game, powerful CPUs are required and not the GPUs. For a graphics intensive game, powerful GPUs are required and not CPUs. A geo-location identifier 320A within the usage identifier 320 is used to identify the geo-locations where the usage demand is predicted. Similarly, a sub-system identifier 320B is used to identify the sub-systems that are required to satisfy the usage demand. Information from the usage identifier 320 is provided to the resource allocation agent 302B.

The resource allocation agent 302B uses the information provided by the usage identifier 320 to identify the geo locations and the type and amount of system resources (including specific sub-systems) required at the identified geo locations to meet the usage spike predicted for the game. The resource allocation agent 302B then queries a resource scheduler to obtain current state of the system resources at the identified geo locations where the usage demand is predicted, including the current state of the sub-systems. The resource allocation agent 302B sends a signal to one or more data centers associated with the identified geo locations to execute instances for the game and to provision specific sub-systems of system resources, based on the anticipated usage spike identified by the usage spike predictor 318. The resource allocation agent 302B may follow an "elastic compute" concept when sending the signal to the data centers, wherein the signal may be to scale up or scale down certain ones of the system resources to meet the predicted use demand for the game. The provisioning of instances and system resources are performed in anticipation of the users using the instances and/or system resources by accessing the game and is done prior to receiving any selection activity of the particular game.

Various types of servers can be used on which a game engine can be instantiated for building a resource allocation model that is used to predict usage demand for a particular game, in some example implementations. The server can be a physical server. The physical server may be a stand-alone server or may be part of a data center within the cloud gaming system. The server in the data center may be an independent server within the data center or be part of a rack, with each rack containing multiple server computing devices. The physical server includes the necessary resources, such as operating system, memory, microprocessor for executing the game engine. The functional portions of the game engine are stored in the memory, processed using the microprocessor and managed by the operating system.

In one implementation, to provide faster processing of the online interactions, instances of the distributed game engine may be executed in parallel on different servers that are part of a single data center within the CGS 300. This configuration works efficiently as data can be exchanged between the different servers within the data center without much latency. In an alternate implementation, the plurality of servers of the CGS 300 executing instances of the distributed game engine may be part of a plurality of data centers that are distributed geographically. In such implementation, the usage features resulting from the analysis of the online interactions are exchanged amongst the servers in the different servers so that the analysis can be done in a fast and efficient manner Even though the instances of the game engine are distributed among different data centers, the resource allocation model may, in some implementation, be maintained in one central server within the CGS 300 so as to provide consistency in training the resource allocation model.

In some implementations, the server could be a virtual machine within the cloud gaming system that is configured to support training the resource allocation model using the online interactions of a plurality of games, utilizing the hardware resources available to the hypervisor of the host.

The virtual machine may also include one or more applications (e.g., one or more online game applications), that can be executed by an operating system using the hardware resources available to the virtualization layer (i.e., hypervisor) of the host machine.

In some other implementations, the server that is used to generate and train a resource allocation model could be part of a cloud container that allows an application, such as the online game application, and all its dependencies, libraries, and configuration files that are needed to run the online game application, to be bundled together into a virtual container with the application using the allocated resources within the container to run the application. The container operates without a full operating system, thereby providing an operating system-level virtualization.

In some implementations, users may connect to the online game applications of the cloud game system from anywhere in the world. The online game application enables such connections by initiating multiple game instances on different servers of different data centers distributed across the world. The users' input data generated at the respective client devices during game play of online game are collected from the network of servers by the distributed game engine and frames of game data are returned to the respective client devices, using any one of network models. Some examples of network models that may be used to communicate between servers of the cloud gaming system described in this application include a TCP/IP network model or International organization of Standardization (ISO) based open system interconnection (OSI) network architecture. The data processing and communication between the distributed servers may follow any one of a plurality of existing protocols. The ISO model includes a set of application layers (Application layer, Presentation layer, Session layer) and data flow layers (transport layer, network layer, data link layer and physical layer). The application layers are configured to identify the transmitting and receiving entities, transfer data of an application, such as the online game, between the transmitting and receiving entities in a manner that is understood by the respective entities, and to manage and synchronize communication between the transmitting and receiving entities with minimal data loss. The data flow layers are configured to determine if data transmission should be carried out in sequential or parallel path, a protocol that is to be followed for packetizing the data, assembling the packetized data into frames and transmitting the frames of data along a preferred route. It should be noted that the above mentioned description provides only an overview of the ISO model used in communicating the data through the network of servers for the online game and that the finer details of the role of the various layers are understood by one skilled in the art, and is therefore not described in greater detail.

Figure 4:
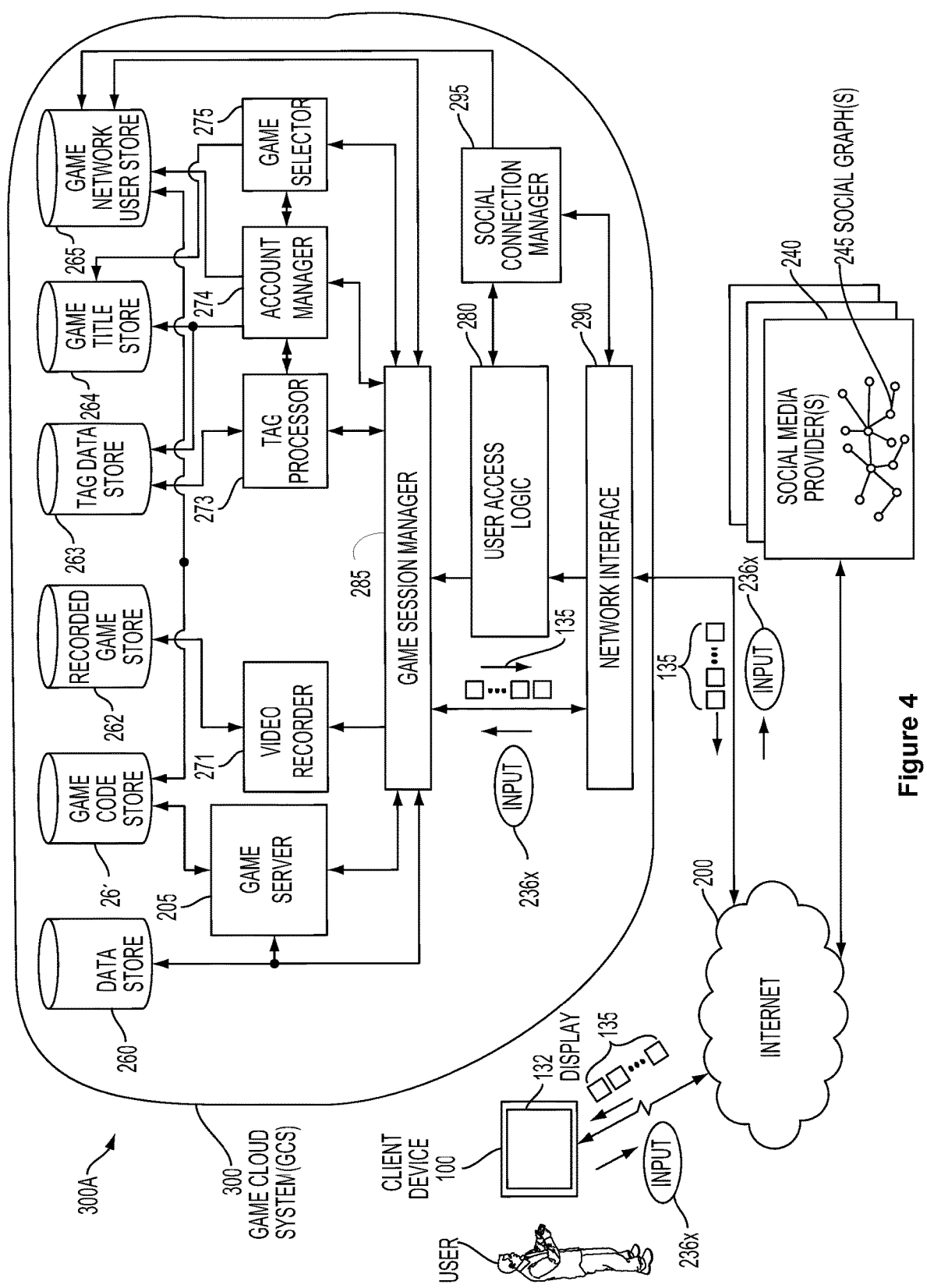
FIG. 4 illustrates a system diagram of a cloud gaming system used for executing an online game and to provide frames of game data over a cloud game network to one or more client devices, in accordance with one implementation of the present disclosure.

FIG. 4 illustrates an overview of an example CGS 300A supporting the collection of user interactions to update training data and using the updated training data to build and/or train resource allocation model that is used to predict usage demand for an online game, in accordance with one implementation of the present disclosure. In particular, system diagram 300A enables accessing and playing of video games stored in a cloud gaming system (CGS) 300. Generally speaking, cloud gaming system CGS 300 may be a cloud computing system operating over a network 200 to support a plurality of players playing a online game application through corresponding game plays. Online interactions between players and/or users provided from within the online game (in-game interactions) or outside of the game (off-game interactions) are used as training data for building and/or training a resource allocation model. The online interactions may be provided using interactive tools provided within the online game or may be provided using interactive tools provided by interactive applications, such as social media applications, email application, text message application, etc. The online interactions may be conversations or discussions that include social topics related to online games and may be in the form of messages, weblogs, emails, social media interactions, etc.

In particular, system 300A includes CGS 300, one or more social media providers 240, and a client device 100, all of which are connected via a network 200 (e.g., internet). A plurality of client devices associated with a plurality of users may be connected to network 200 to access services provided by CGS 300 and social media providers 240. The users may be players or spectators that follow game play of a particular player or of the online game.

In one embodiment, cloud gaming system 300 includes a game server 205, a video recorder 271, a tag processor 273, and account manager 274 that includes a user profile manager, a game selection engine (i.e., game selector) 275, a game session manager 285, user access logic 280, a network interface 290, and a social connection manager 295. CGS 300 may further include a plurality of storage systems, such as a game state store, user accounts, user data history datastore, etc., which may be stored generally in datastore 260. Other game storage systems may include a game code store 261, a recorded game store 262, a tag data store 263, video game title store 264 (which is similar to game titles datastore 310 of FIGS. 1 and 2), game events datastore (312 in FIGS. 1 and 2), online interaction datastore (306 in FIGS. 1 and 2), social media and other off-game interaction datastore (304 in FIGS. 1 and 2), and a game network user store 265. In one embodiment, CGS 300 is a system that can provide online game applications, services, gaming related digital content, and interconnectivity among systems, applications, users, and social networks. CGS 300 may communicate with user device 100 and social media providers 240 through social connection manager 295 via network interface 290. Social connection manager 295 may be configured to relate one or more friends. In one embodiment, each social media provider 240 includes at least one social graph 245 that shows user social network connections.

A player (i.e., user) is able to access services provided by CGS 300 via the game session manager 285. For example, account manager 274 enables authentication and access by a player to game titles on the CGS 300. Account manager 274 stores information about users (players, spectators) and manages the user profile for each user. User information can be used by the account manager 274 for authentication purposes. Additionally, game titles owned by a user may be managed by account manager 274. For example, video games stored in game title store 264 are made available to a user who owns or is provided access to those video games.

In one embodiment, a user can access the services provided by CGS 300 and social media providers 240 by way of client device 100 through connections over network 200. Client device 100 can include any type of device having a processor and memory, wired or wireless, portable or not portable. In one embodiment, client device 100 can be in the form of a smartphone, a tablet computer, or hybrids that provide touch screen capability in a portable form factor. One exemplary client device can include a portable phone device that runs an operating system and is provided with access to various applications (apps) that may be obtained over network 200, and executed on the local portable device (e.g., smartphone, tablet, laptop, desktop, etc.).

Client device 100 includes a display 132 that acts as an interface for user to send input commands 236 and display data and/or information 135 received from CGS 300 and social media providers 240. Display 132 can be configured as a touch-screen, or a display typically provided by a flat-panel display, a cathode ray tube (CRT), or other device capable of rendering a display. Alternatively, the client device 100 can have its display 132 separate from the device, similar to a desktop computer or a laptop computer.

In one embodiment, client device 100 is configured to communicate with CGS 300 to enable user (player) to play a video game. For example, player may select (e.g., by game title, etc.) a video game that is available in the game title data store 264 via the game selection engine 275. The selected video game is enabled and an instance of the video game is loaded for execution by game server 205 on the CGS 300. In one embodiment, game play is primarily executed in the CGS 300, such that client device 100 will receive a stream of game video frames 135 from CGS 300, and user input commands 236 for driving the game play is transmitted back to the CGS 300. The received video frames 135 from the streaming game play are rendered on display 132 of client device 100.

In one embodiment, after the player chooses an available game title to play, a game session for the chosen game title may be initiated by the player through game session manager 285. Game session manager 285 first accesses game state store in data store 260 to retrieve the saved game state of the last session played by the player (for the selected game), if any, so that the player can restart game play from a previous game play stop point. Once the resume or start point is identified, the game session manager 285 may inform game execution engine in game server 205 to execute the game code of the chosen game title from game code store 261. After a game session is initiated, game session manager 285 may pass the game video frames 135 (i.e., streaming video data), via network interface 290 to a client device, e.g., client device 100.

During game play, game session manager 285 may communicate with game server 205, recording engine in the video recorder 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data store 263.

During game play, game session manager 285 may communicate with game server 205 to deliver and obtain user input commands 236 that are used to influence the outcome of a corresponding game play of the video game. Input commands 236 entered by player may be transmitted from client device 100 to game session manager 285 of CGS 300. Input commands (e.g., controller inputs or user inputs) 236, including input commands used to drive game play and user interactive input, such as tag content (e.g., texts, images, video recording clips, etc.). Game input commands as well as any user play metrics (how long the user plays the game, etc.) may be stored in game network user store. Select information related to game play for the video game may be used to enable multiple features that may be available to the user.

Accordingly, the present disclosure described systems and methods implementing machine learning (also referred to as deep learning) algorithm to build a resource allocation model using training data collected from a network of servers executing instances of an online game application supporting one or more game plays, and for using the trained resource allocation model to provide various functionalities relating to the online game application and/or game plays of the online game application, in various embodiments.

As mentioned earlier, the resource allocation model is built using a network of interconnected nodes. Each node learns some information from discussion features identified from online interactions that are provided as input to the resource allocation model. Knowledge is exchanged between the different nodes within the network through the interconnections. Discussion features input to the resource allocation model activates an initial set of nodes in the network. In turn, this initial set of nodes activates other nodes, thereby propagating knowledge learnt from one node to the next about the game input. This activation process is repeated across other nodes, thereby building on the knowledge, to provide an output. The output represents expected or predicted outcome for given set of discussion features provided as training data, which also includes activity state of the game, and resource allocation criteria, that is used to train the inputs to obtain outputs that meet the different resource allocation criteria. The outputs from the resource allocation model are then used with current online interactions received from the users to predict game use for the game so that resources can be provisioned ahead of time, in anticipation the resources will be used by users providing the online interactions by selecting the game. The resource allocation model is trained to use different discussion features to learn usage demand for different resource allocation criteria and to identify every possible configuration of resources that may be needed to satisfy usage demand for the game. Thus, when the resource allocation model is given a set of discussion features (e.g., social topics, clustering of social topics, frequency of social topics, etc.) from online interactions obtained from online social interactions of a plurality of users for the game, the resource allocation model can provide an output that most aligns with the resource allocation criteria defined for the game.

The resource allocation model may be generated through various machine learning (i.e., AI) algorithms, including deep learning (i.e., machine learning), reinforcement learning, supervised learning, unsupervised learning, semi-supervised learning, incremental learning, rewards based learning, etc. The types of AI algorithm listed above are just given for purposes of illustration and is not exhaustive or limiting. In some implementations, the resource allocation model is generated using neural network, with the network consisting of multiple layers of inter-connected nodes. Each edge of the network is accorded a weight, and a set of computational rules are applied as the input data (i.e., discussion features) is passed from an input layer to the output layer. An optimization algorithm (e.g., gradient descent algorithm, etc.) within the machine learning algorithm may use different portions of the discussion features as model's variable parameters and tune the variable parameters in a manner that minimizes the loss in the variable parameters. The discussion features in the multilayer neural network of the resource allocation model is thus used by the machine learning algorithm to learn the intricacies of the discussion features and their influence on the outputs.

Classifiers are used to identify the different portions of the discussion features for populating the different nodes of the resource allocation model and link a given set of discussion features associated with the input nodes to a specific output. The trained resource allocation model is used for determining current resource allocation for the game, predict usage demand (i.e., game use) for the game based on current online interactions obtained from the plurality of users, by taking the output from the resource allocation model for a given success criterion and applying the current online interactions to determine if an usage spike can be anticipated to occur by the users providing the current online interactions. Based on the determination, the resources allocated for the game can be elastically scaled so as to provide sufficient resources for the game in anticipation the resources will be used when the users providing the online interaction access the game for game play.

Figure 5:
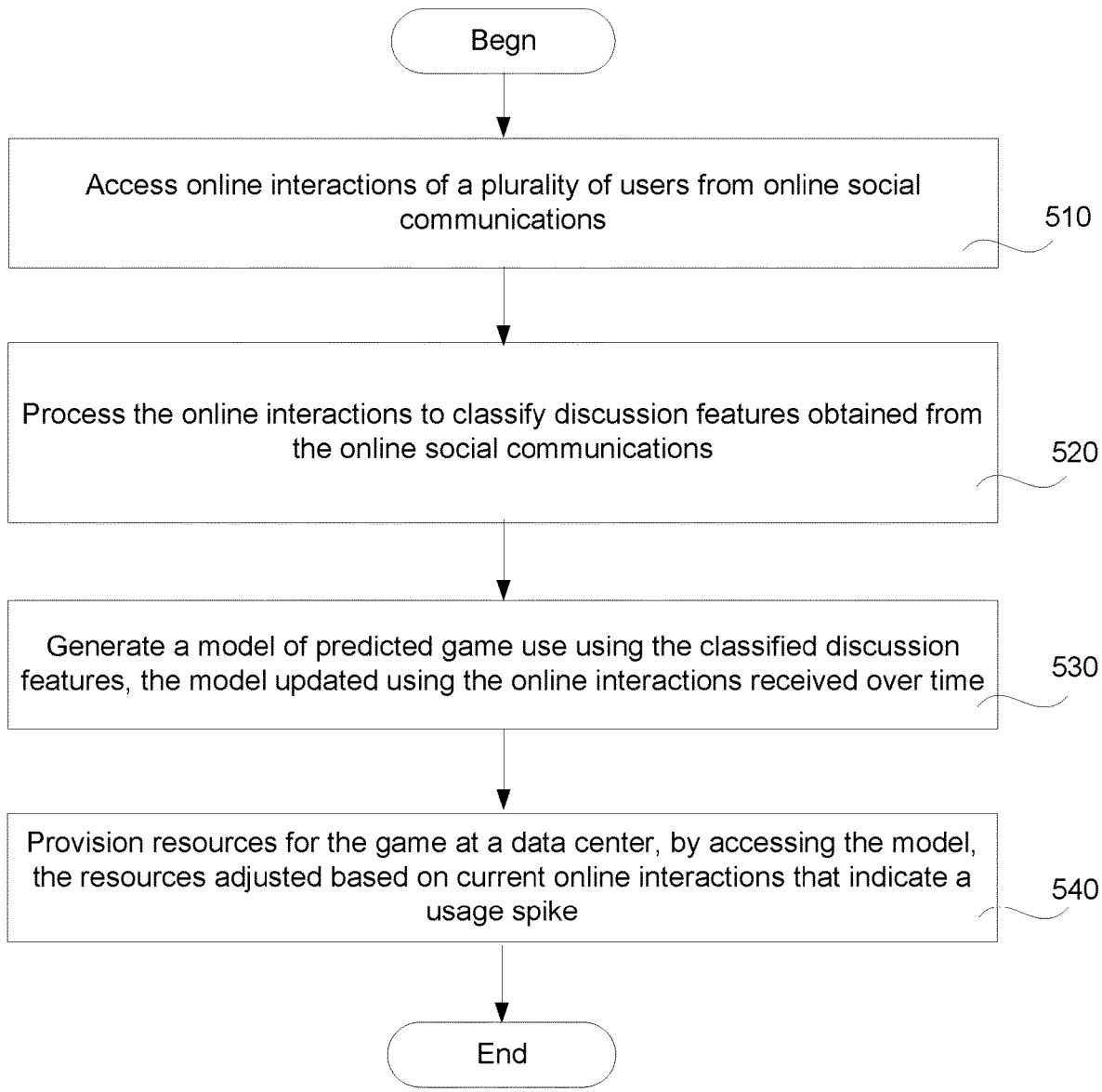
FIG. 5 illustrates flow operations of a method for provisioning resources for the online game, using a resource allocation model, in accordance with one implementation of the present disclosure.

FIG. 5 illustrates a sample flow operations of a method for provisioning resources for an online game, in accordance with one implementation. The method begins at operation 510 wherein online interactions of a plurality of users related to a game are accessed. The online interactions include social topics that are related to the game. The online interactions are accessed from online social communications that include in-game interactions and off-game interactions. The online interactions may be provided by users prior to the users selecting the game. The off-game interactions may include social media interactions or other types of online interactions that were provided using interactive tools. The online interactions are processed, as illustrated in operation 520. The processing includes performing keyword analysis of the content of the online interactions to identify the social topics and to define discussion features. The discussion features are classified based on the sequence and/or context of the social topics. The discussion features are defined based on the social topics, frequency of occurrence of the social topics, pattern of occurrence of the social topics, number of interactions that are discussing the social topics, context of the social topics (e.g., positive or negative comments or reviews related to the social topics, etc.) etc. The discussion features are classified based on the social topics discussed and the pattern of appearance of the social topics in the online interactions.

A resource allocation model is generated using the classified discussion features, as illustrated in operation 530. The model includes a plurality of interconnected nodes and different ones of the discussion features are used to populate the different nodes. The inter-relationships between the nodes are used to understand the intricacies of the patterns of social topics included in the discussion features for the game to identify different usage outputs that meet the resource allocation criteria defined for the game. The social topics and the patterns of occurrence of the social topics are used to predict game use. The game use is continually trained using the online interactions received over time.

The resources for the game are provisioned at a data center, as illustrated in operation 540. The provisioning of the resources includes accessing the resource allocation model to identify any adjustments to the provisioning of the resources. Based on the adjustments to the provisioning, there can be an increase in the amount of resource for the game provisioned at the data center. The adjustments to the provisioning may be made when the model indicates an anticipated usage spike is to occur by the actions of the plurality of users and indication may be based on current online interactions received from the plurality of users. The increase in the amount of resources that needs to be provisioned is determined by correlating the discussion features of the current online interactions with corresponding discussion features in the resource allocation model. Using the correlated discussion features, a resource usage output that is mapped to the correlated discussion features is identified. This resource usage output indicates the amount by which the resources that are to be provisioned needs to be increased to meet the anticipated usage spike.

The provisioning of resources may include provisioning a number of instances of the game and scaling up the resources for executing the instances in proportion to the usage spike anticipated from the current online interactions. The provisioning of the instances and resources is done prior to receiving any selection request for the game from the users and is done in anticipation that the instances and resources will be used by the users when the users access the game for performing an activity, such as game play activity. Once the resources are provisioned, the current online interactions are used to further train the resource allocation model. The trained resource allocation model is used for predicting game use of the game when additional online interactions are received from the users.

The prediction engine can be provided in software, hardware, firmware, or any combination thereof. The prediction engine is configured to use the online interactions provided through online social communications of a plurality of users, monitor the plurality of users' activities, and predict spikes in users' activities. By predicting the spikes in users' activities and associated server load, the resources are scaled up ahead of time. The prediction engine is also configured to check different spike triggers (e.g., game events, such as new release, promotion, competition, etc., of a game, or predictive game usage, such as identifying prior load spikes to predict current load, predicting users will group load, social discussions, etc.), and to scale up the resources proportionate to anticipated resource load demands. The anticipated resource load demands can be gathered from in-game activities and off-game activities. For example, social media signals as well as communications between users (both in-game and off-game) can be used to predict spikes. The model that is built assists in the prediction of what types of resources are needed for satisfying the anticipated spike.

Figure 6:
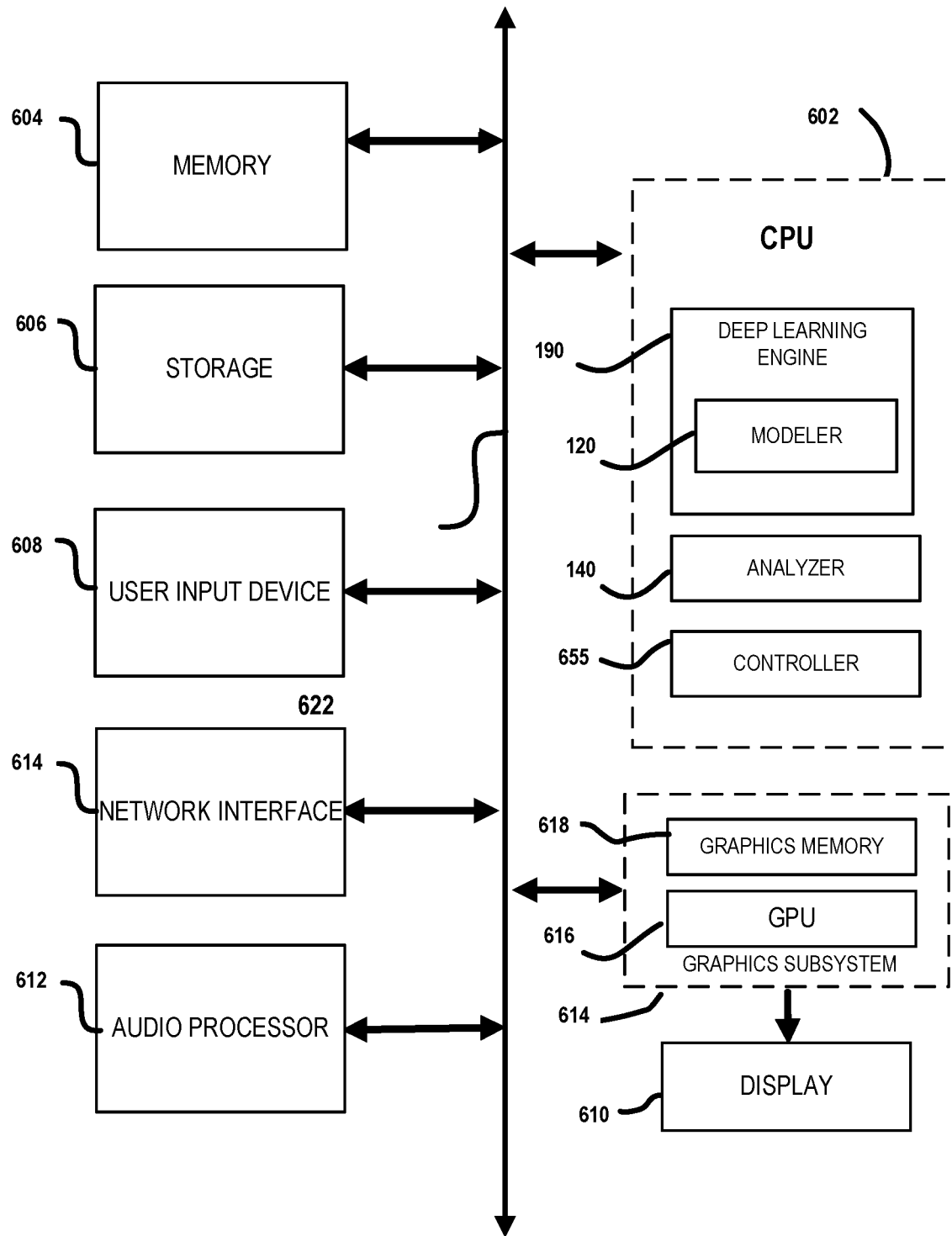
FIG. 6 illustrates components of an example server computing device used for building and training a resource allocation model (artificial intelligence (AI) model) using a model trainer, in accordance with one implementation of the present disclosure.

FIG. 6 illustrates components of an example server device 600 that can be used to perform aspects of the various embodiments of the present disclosure. For example, FIG. 6 illustrates an exemplary server system with hardware components suitable for training an AI model that is capable of performing various functionalities in relation to an online game and/or game plays of the online game, in accordance with one embodiment of the present disclosure. This block diagram illustrates a device 600 that can incorporate or can be a personal computer, a server computer, gaming console, mobile device, or other digital device, each of which is suitable for practicing an embodiment of the invention. Alternately, the functionalities of the device could be implemented in a physical server or on a virtual machine or a container server. Device 600 includes a central processing unit (CPU) 602 for running software applications and optionally an operating system. CPU 602 may be comprised of one or more homogeneous or heterogeneous processing cores.

In accordance with various embodiments, CPU 602 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 602 may be configured to include the AI engine that is configured to support and/or perform learning operations with regards to providing various functionalities (e.g., predicting) in relation to an online game and/or game plays of the online game. The deep leaning engine may include a modeler 120 that is configured for building and/or training the AI model that is configured to provide the various functionalities related to the online game and/or game plays of the online game. Further, the CPU 602 includes an analyzer 140 that is configured for generating and training an AI model. The trained AI model provides an output in response to a particular set of users' inputs, wherein the output is dependent on the predefined functionality of the trained AI model. The trained AI model may be used to determine the resource allocation that is to be implemented during the game play to meet the success criteria defined for the online game. The analyzer 140 is configured to perform various functionalities in relation to the online game and/or game plays of the online game, including analyzing the output from the trained AI model 160 for a given input (e.g., controller input, game state data, success criteria), and provide a response.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, game controllers, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 613 is further connected with data bus 622 and the components of the device 600. The graphics subsystem 613 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 616, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs. In one embodiment, GPU 616 may be implemented within AI engine to provide additional processing power, such as for the AI or deep learning functionality.

The graphics subsystem 613 periodically outputs pixel data for an image from graphics memory 618 to be displayed on display device 610, or to be projected by projection system 640. Display device 610 can be any device capable of displaying visual information in response to a signal from the device 600, including CRT, LCD, plasma, and OLED displays. Device 600 can provide the display device 610 with an analog or digital signal, for example.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

The invention claimed is:

1. A method for provisioning resources for games executed by a cloud gaming system, comprising,
accessing online interactions of a plurality of users in relation to a game, the online interactions relate to social topics that include the game, wherein online interactions are accessed from online social communications by one or more of said plurality of users, the online interactions provided by the plurality of users is prior to providing selection activity for accessing the game for game play;
processing the online interactions to classify discussion features obtained from said online social communications;
generating a model of predicted game use using the classified discussion features, the model being updated over time based on the accessing of online interactions and processing of the online interactions; and
provisioning resources for the game at a data center, the provisioning includes accessing the model to identify adjustments in the provisioning of resources, the adjustments include increasing an amount of resources for the game at the data center when the model indicates, based on current online interactions, that an anticipated usage spike is to occur from said plurality of users, the provisioning performed prior to the plurality of users accessing the game for game play.

2. The method of claim 1, wherein the online social communications include in-game interactions or off-game interactions, the off-game interactions include social media interactions or other interactions provided outside of the game.

3. The method of claim 1, wherein the social topics are identified using keywords within the online interactions.

4. The method of claim 1, wherein classifying discussion features includes,
performing keyword analysis of an online interaction generated by a user, to identify keywords relating to social topics;
identifying distribution of the keywords within the online interaction, the distribution of keywords used to define the discussion features;
determining an activity performed in the game by the user following the online interaction; and
classifying the discussion features based on the distribution of the keywords and the activity performed in the game, the classification used in determining usage spike for the game.

5. The method of claim 1, wherein the online interactions are provided by the plurality of users prior to accessing the game, and the model is updated with the discussion features identified from the online interactions and accessing performed in the game by the plurality of users, upon accessing the game following the online interactions.

6. The method of claim 1, wherein provisioning resources for the game includes identifying a geo location where the usage spike is to occur and provisioning the resources for the game at the data center associated with the geo location.

7. The method of claim 1, wherein provisioning resources for the game includes,
identifying specific sub-systems of the resources required at the data center for the anticipated usage spike; and
provisioning the specific sub-systems at the data center in proportion to the anticipated usage spike.

8. The method of claim 1, wherein resources are provisioned in accordance to a number of instances of the game to be executed, wherein the number of instances is in proportion to the anticipated usage spike.

9. The method of claim 1, wherein predicting game use for the game includes correlating a pattern of occurrence of the discussion features in the current online interactions with a corresponding pattern in the model, the pattern in the model used in mapping the discussion features to an output predicting game use.

10. A resource usage prediction engine executing on a cloud gaming system for provisioning resources for games, comprising:
an interaction analyzer configured to access online interactions from online social communications of a plurality of users and process the online interactions related to a game to classify discussion features obtained from said online social communications, the online interactions received from the plurality of users prior to receiving selection activity for accessing the game for game play;
a model trainer configured to generate a model of predicted game use using the classified discussion features, the model trainer updating the model based on online interactions accessed and processed over time;
a usage spike predictor configured to access the model and predict game use using the classified discussion features of the model; and
a resource allocation agent configured to provision resources for the game at a data center, the resource allocation agent configured to access the model to identify adjustments in the provisioning of resources, wherein the adjustments identify increase in amount of resources for the game at the data center, when the model indicates likelihood of occurrence of anticipated usage spike, based on current online interactions, the resources provisioned prior to the plurality of users accessing the game for game play.

11. The resource usage prediction engine of claim 10, wherein the model trainer is configured to update the model using the current online interactions.

12. The resource usage prediction engine of claim 10, wherein the online social communications include in-line interactions and off-line interactions, the off-line interactions include social media interactions and other interactions provided outside of the game.

13. The resource usage prediction engine of claim 12, wherein the interaction analyzer is configured to obtain and process the in-line interactions and the off-line interactions to identify discussion features.

14. The resource usage prediction engine of claim 10, further includes a usage identifier configured to identify geo locations where the anticipated usage spikes occur and to generate a signal to the resource allocation agent to provision the resources at the identified geo locations.

15. The resource usage prediction engine of claim 14, wherein the usage identifier is further configured to identify specific sub-systems of resources within each of the geo locations that are to be provisioned in proportion to the anticipated usage spikes.

* * * * *